US010030173B2

(12) United States Patent
Nakazawa et al.

(10) Patent No.: US 10,030,173 B2
(45) Date of Patent: Jul. 24, 2018

(54) PRESSURE-SENSITIVE ADHESIVE MICROCAPSULE, PRESSURE-SENSITIVE ADHESIVE MICROCAPSULE-CONTAINING LIQUID, GLUING SHEET AND METHOD FOR MANUFACTURING SAME, AND METHOD FOR MANUFACTURING LAMINATE

(71) Applicant: FUJIFILM Corporation, Tokyo (JP)

(72) Inventors: Takahiro Nakazawa, Fujinomiya (JP); Satoshi Tanaka, Fujinomiya (JP); Yoshihito Hodosawa, Fujinomiya (JP); Masaki Noro, Fujinomiya (JP); Daisaku Abiru, Fujinomiya (JP); Naoki Nakamura, Fujinomiya (JP); Masashi Yamauchi, Fujinomiya (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/214,681

(22) Filed: Jul. 20, 2016

(65) Prior Publication Data
US 2016/0326400 A1 Nov. 10, 2016

Related U.S. Application Data

(63) Continuation of application No. PCT/JP2015/050468, filed on Jan. 9, 2015.

(30) Foreign Application Priority Data

Feb. 17, 2014 (JP) ................................. 2014-027197

(51) Int. Cl.
| | |
|---|---|
| C09J 7/38 | (2018.01) |
| B32B 37/10 | (2006.01) |
| B32B 37/12 | (2006.01) |
| C09J 7/02 | (2006.01) |
| C09J 109/00 | (2006.01) |
| C09J 175/04 | (2006.01) |
| C09J 175/16 | (2006.01) |
| C09J 201/00 | (2006.01) |
| C08G 18/70 | (2006.01) |

(52) U.S. Cl.
CPC .............. *C09J 7/0207* (2013.01); *B32B 37/10* (2013.01); *B32B 37/12* (2013.01); *B32B 37/1284* (2013.01); *C08G 18/706* (2013.01); *C09J 7/38* (2018.01); *C09J 109/00* (2013.01); *C09J 175/04* (2013.01); *C09J 175/16* (2013.01); *C09J 201/00* (2013.01); *B32B 2037/1246* (2013.01); *B32B 2333/08* (2013.01); *B32B 2375/00* (2013.01); *C09J 2205/11* (2013.01); *C09J 2205/31* (2013.01); *C09J 2409/00* (2013.01); *C09J 2423/00* (2013.01); *C09J 2433/00* (2013.01); *C09J 2475/00* (2013.01)

(58) Field of Classification Search
None
See application file for complete search history.

(56) References Cited

FOREIGN PATENT DOCUMENTS

| | | | | |
|---|---|---|---|---|
| JP | 63-275688 A | | 11/1988 | |
| JP | S63-275688 A | * | 11/1988 | .............. B01J 13/02 |
| JP | 2000-263937 A | | 9/2000 | |
| JP | 2002-60717 A | | 2/2002 | |
| JP | 2002-97444 A | | 4/2002 | |
| JP | 2002-307399 A | | 10/2002 | |
| JP | 3629072 B2 | | 3/2005 | |
| JP | 2008-24779 A | | 2/2008 | |
| JP | 2008024779 A | * | 2/2008 | |
| WO | 2010/027041 A1 | | 3/2010 | |
| WO | WO-2010027041 A1 | * | 3/2010 | ............ C08F 279/02 |

OTHER PUBLICATIONS

WO2010027041 English Machine Translation, printed Dec. 1, 2017. (Year: 2017).*
JPS63-275688 English Machine Translation, printed Dec. 1, 2017. (Year: 2017).*
JP2008-024779 English Machine Translation, printed Dec. 1, 2017. (Year: 2017).*
Communication dated Jun. 13, 2017 from the Japanese Patent Office in counterpart application No. 2014-027197.
International Preliminary Report on Patentability dated Aug. 23, 2016, in corresponding International Application No. PCT/JP2015/050468 with English translation of Written Opinion, 8 pages in English and Japanese.
International Search Report for PCT/JP2015/050468 dated Apr. 7, 2015.

(Continued)

*Primary Examiner* — Christopher M Rodd
(74) *Attorney, Agent, or Firm* — Sughrue Mion, PLLC

(57) ABSTRACT

In a pressure-sensitive adhesive microcapsule, a radiation-curable gluing agent is encapsulated by a wall film, and the average particle diameter is smaller than 500 µm. A pressure-sensitive adhesive microcapsule-containing liquid includes the pressure-sensitive adhesive microcapsule and a binder. A gluing sheet includes a layer including the pressure-sensitive adhesive microcapsule on a support. A method for manufacturing the gluing sheet includes forming a layer including a pressure-sensitive adhesive microcapsule on a support by applying the pressure-sensitive adhesive microcapsule-containing liquid onto the support and then carrying out radiation irradiation. A method for manufacturing a laminate includes gluing the gluing sheet and an adherend by bringing a surface of the layer including the pressure-sensitive adhesive microcapsule in the gluing sheet and the adherend into contact with each other and compressing them together.

13 Claims, No Drawings

(56) References Cited

OTHER PUBLICATIONS

Foreign Written Opinion for PCT/JP2015/050468 dated Apr. 7, 2015.
Communication dated Jan. 30, 2018, from Japanese Patent Office in counterpart application No. 2014-027197.

* cited by examiner

PRESSURE-SENSITIVE ADHESIVE MICROCAPSULE, PRESSURE-SENSITIVE ADHESIVE MICROCAPSULE-CONTAINING LIQUID, GLUING SHEET AND METHOD FOR MANUFACTURING SAME, AND METHOD FOR MANUFACTURING LAMINATE

CROSS-REFERENCE TO RELATED APPLICATIONS

This application is a Continuation of PCT International Application No. PCT/JP2015/050468 filed on Jan. 9, 2015, which claims priority under 35 U.S.C. § 119(a) to Japanese Patent Application No. 2014-027197 filed on Feb. 17, 2014. Each of the above application(s) is hereby expressly incorporated by reference, in its entirety, into the present application.

BACKGROUND OF THE INVENTION

1. Field of the Invention

The present invention relates to a pressure-sensitive adhesive microcapsule, a pressure-sensitive adhesive microcapsule-containing liquid, a gluing sheet and a method for manufacturing the same, and a method for manufacturing a laminate.

2. Description of the Related Art

Pressure-sensitive gluing agents and pressure-sensitive gluing sheets are being used in a variety of fields, and it is expected that there will be demands in signage fields such as sign boards or bulletin boards, packaging fields, stationery fields, and the like in the future. Pressure-sensitive gluing sheets have gluing properties to a certain degree even before being glued to an adherend, and thus releasing paper or releasing films are used in order to protect gluing layers in gluing sheets.

In addition, gluing agents which eliminate the necessity for releasing paper or releasing films by using microcapsules have been proposed. For example, JP2000-263937A describes a heat-sensitive recording sheet for a label in which an adhesive layer containing a microcapsule in which an adhesive is used as a core substance is provided on a side opposite to a heat-sensitive recording layer in a support. The adhesive capsule described in JP2000-263937A is a pressure-sensitive adhesive capsule which is not adhesive before a pressurization treatment but exhibits adhesiveness when pressurized. JP2002-97444A describes heat-sensitive gluing agent capsules which are not adhesive at room temperature but exhibits adhesiveness when heated. JP3629072B describes a weakly-gluing label continuous body including weakly-gluing fine spherical bodies made of a water-based gluing agent including acrylic acid ester-suspended particles as a main component on the rear surface side of a label base material.

Meanwhile, JP2002-60717A describes a water-based adhesive for dry lamination obtained by mixing a water-dispersible isocyanate into an adhesive for dry lamination in which a polyester polyurethane-based adhesive is used. Furthermore, JP2008-24779A describes a pressure-sensitive adhesive microcapsule in which a solvent-type adhesive is encapsulated by a polyurea-polyurethane resin wall film containing a polymer of a water-dispersible polyhydric isocyanate compound.

Furthermore, WO2010/027041A describes a photocurable adhesive composition for touch panel adhesion including (A) a (meth)acrylate oligomer having polyisoprene, polybutadiene, or polyurethane in the skeleton and (B) a softening component. In addition, JP2002-307399A describes a microcapsule having a size in a range of 0.5 mm to 1.5 mm in which a photocurable resin, a photopolymerization initiator, and 0.5 mm or smaller fine substances are encapsulated as core substances.

SUMMARY OF THE INVENTION

In the case of gluing sheets requiring releasing paper or releasing films, the installation of releasing paper or releasing films becomes more difficult as the sizes of the gluing sheets increase. Therefore, the costs for the installation of releasing paper or releasing films account for the majority of the costs for the installation of gluing sheets, and thus there is a problem with costs.

The adhesive layer, the gluing layer, the weakly-gluing fine spherical bodies, and the adhesive described in JP2000-263937A, JP2002-97444A, JP3629072B, and JP2002-60717A have a problem in that the gluing force is not sufficient or it is not possible to control the gluing force or the fluidity. Particularly, in a case in which an isocyanate compound is used as a wall material, and an acrylic adhesive is included as a core substance, an acrylic resin which is a main component of the acrylic adhesive and the isocyanate compound react and crosslink with each other, and thus there is a problem in that the gluing force is weakened or deactivated. In addition, when gelatin, rubber, sodium alginate, or the like is used as a wall material, there is a problem in that it is not possible to obtain a sufficient strength of the wall material.

The adhesive described in JP2008-24779A is described as not exhibiting adhesiveness when weakly compressed, and exhibits excellent adhesiveness when glued (that is, strongly compressed), but there are problems with insufficient adhesiveness and also insufficient reproducibility. When the microcapsule described in JP2002-307399A is used as a gluing sheet, it becomes difficult to maintain transparency, and thus there is a problem in that the microcapsules are not suitable for being glued to members requiring transparency.

The present invention has been made in order to solve the above-described problems. That is, an object of the present invention is to provide a pressure-sensitive adhesive microcapsule which has no gluing properties (no gluing force) (that is, has fluidity) until pressure is applied, but has a gluing force after pressure is applied and in which the gluing force or the fluidity can be controlled as desired. Furthermore, another object of the present invention is to provide a pressure-sensitive adhesive microcapsule-containing liquid in which the pressure-sensitive adhesive microcapsule is used, a gluing sheet and a method for manufacturing the same, and a method for manufacturing a laminate.

As a result of intensive studies carried out for achieving the above-described objects, the present inventors found that a pressure-sensitive adhesive microcapsule manufactured by encapsulating a radiation-curable gluing agent in a wall film has no gluing properties until pressure is applied, but can obtain sufficient gluing properties after pressure is applied, and completed the present invention.

Specifically, the present invention has the following constitutions.

(1) A pressure-sensitive adhesive microcapsule having an average particle diameter of smaller than 500 μm, in which a radiation-curable gluing agent is encapsulated by a wall film.

(2) The pressure-sensitive adhesive microcapsule according to (1), in which the radiation-curable gluing agent includes an acrylate oligomer or a methacrylate oligomer having polyisoprene, polybutadiene, or polyurethane in a skeleton.

(3) The pressure-sensitive adhesive microcapsule according to (2), in which the radiation-curable gluing agent further includes a softening component and a polymerization initiator.

(4) The pressure-sensitive adhesive microcapsule according to (2) or (3), in which the radiation-curable gluing agent further includes an adhesion promoter.

(5) The pressure-sensitive adhesive microcapsule according to any one of (1) to (4), in which the wall film is constituted of a water-dispersible isocyanate.

(6) A pressure-sensitive adhesive microcapsule-containing liquid comprising: the pressure-sensitive adhesive microcapsule according to any one of (1) to (5) and a binder.

(7) The pressure-sensitive adhesive microcapsule-containing liquid according to (6), in which a content of the water-dispersible isocyanate is in a range of 0.18% by mass to 5.8% by mass of a total solid content of the pressure-sensitive adhesive microcapsule-containing liquid.

(8) A gluing sheet comprising: a layer including the pressure-sensitive adhesive microcapsule according to any one of (1) to (5) on a support.

(9) The gluing sheet according to (8), in which the layer including the pressure-sensitive adhesive microcapsule is formed on the support by applying the pressure-sensitive adhesive microcapsule according to (6) or (7) onto the support and then carrying out radiation irradiation.

(10) The gluing sheet according to (9), in which a radiation irradiation amount is in a range of 10 J/cm² to 5.000 mJ/cm².

(11) The gluing sheet according to any one of (8) to (10), in which protrusions and recesses are formed using the pressure-sensitive adhesive microcapsule on a surface of the layer including the pressure-sensitive adhesive microcapsule.

(12) The gluing sheet according to any one of (8) to (11), in which an average film thickness of the layer including the pressure-sensitive adhesive microcapsule is smaller than an average particle diameter in the pressure-sensitive adhesive microcapsule.

(13) A method for manufacturing the gluing sheet according to any one of (8) to (12), comprising: forming a layer including a pressure-sensitive adhesive microcapsule on a support by applying the pressure-sensitive adhesive microcapsule-containing liquid according to (6) or (7) onto the support and then carrying out radiation irradiation.

(14) A method for manufacturing a laminate, comprising: gluing the gluing sheet according to any one of (8) to (12) and an adherend by bringing a surface of the layer including the pressure-sensitive adhesive microcapsule in the gluing sheet and the adherend into contact with each other and compressing them together.

According to the present invention, it is possible to provide a pressure-sensitive adhesive microcapsule which has no gluing properties until pressure is applied, but has a gluing force after pressure is applied and in which the gluing force can be controlled as desired. When the pressure-sensitive adhesive microcapsule of the present invention is used, it is possible to provide a gluing sheet that can be glued to an adherend without any releasing paper and releasing films. According to the present invention, it is possible to provide a pressure-sensitive adhesive microcapsule-containing liquid in which the pressure-sensitive adhesive microcapsule is used, a gluing sheet and a method for manufacturing the same, and a method for manufacturing a laminate.

DESCRIPTION OF THE PREFERRED EMBODIMENTS

Hereinafter, the present invention will be described in detail. Constitutional requirements described below will be described on the basis of typical embodiments or specific examples, but the present invention is not limited to those embodiments. Meanwhile, in the present specification, numeric ranges expressed using "to" include numeric values before and after the "to" as the lower limit value and the upper limit value.

(Pressure-Sensitive Adhesive Microcapsule)

In a pressure-sensitive adhesive microcapsule of the present invention, the average particle diameter is smaller than 500 μm, and a radiation-curable gluing agent is encapsulated by a wall film. In the present invention, the radiation-curable gluing agent is used, whereby the pressure-sensitive adhesive microcapsule has no gluing properties until pressure is applied and obtains a gluing force after pressure is applied, and furthermore, it becomes possible to control the gluing force by adjusting the irradiation amount of radiation as desired. In the case of solvent-type gluing agents that have been reported in the related art, it has been wholly unexpected that, while pressure-sensitive adhesiveness which refers to a property of having no gluing properties until pressure is applied and obtaining a gluing force after pressure is applied is not sufficient, when radiation-curable gluing agents are used, it is possible to achieve more favorable pressure-sensitive adhesiveness.

Hereinafter, materials constituting the pressure-sensitive adhesive microcapsule of the present invention will be described.

<Radiation-curable Gluing Agent>

The radiation-curable gluing agent in the present invention is not particularly limited as long as the gluing agent can be cured using radiation, but the radiation-curable gluing agent preferably includes (A) an acrylate oligomer or a methacrylate oligomer having polyisoprene, polybutadiene, or polyurethane in the skeleton. Meanwhile, acrylate oligomers or methacrylate oligomers will also be abbreviated as (meth)acrylate oligomers. Similarly, acrylate monomers or methacrylate monomers will also be abbreviated as (meth)acrylate monomers.

In addition, the radiation-curable gluing agent preferably includes, in addition to the component (A), a softening component (B) and a polymerization initiator (C), and furthermore, as necessary, may include a (meth)acrylate monomer (D), a thiol compound (E), an adhesion promoter (F), and an antioxidant (G).

The scope of radiation mentioned in the present invention includes visible light rays, ultraviolet rays, far ultraviolet rays, electron beams. X-rays, and the like, and particularly, ultraviolet rays such as g rays and i rays are preferred.

<<Component (A)>>

The radiation-curable gluing agent in the present invention preferably includes the component (A) an acrylate oligomer or a methacrylate oligomer having polyisoprene, polybutadiene, or polyurethane in the skeleton. These (meth)acrylate oligomers can be used singly or in combination of two or more kinds.

The (meth)acrylate oligomers having polyisoprene in the skeleton is also referred to as (meth)acrylic-modified polyisoprene, and the weight-average molecular weight thereof is preferably in a range of 1,000 to 100,000 and more preferably in a range of 10,000 to 50,000. As the (meth)acrylate oligomers having polyisoprene in the skeleton, commercially available products may be used, and examples of the commercially available products include "UC-1" (molecular weight of 25,000), "UC-102" (molecular weight of 17,000). "UC-203" (molecular weight of 35,000) all manufactured by Kuraray Co., Ltd., and the like.

The (meth)acrylate oligomers having polybutadiene in the skeleton is also referred to as (meth)acrylic-modified polybutadiene, and the weight-average molecular weight thereof is preferably in a range of 500 to 100,000 and more preferably in a range of 1,000 to 30,000. As the (meth)acrylate oligomers having polybutadiene in the skeleton, commercially available products may be used, and examples of the commercially available products include "TE2000" (molecular weight of 2,000) manufactured by Nippon Oil Corporation, and the like.

The (meth)acrylate oligomers having polyurethane in the skeleton is also referred to as (meth)acrylic-modified polyurethane, and the weight-average molecular weight thereof is preferably in a range of 1,000 to 100,000 and more preferably in a range of 10,000 to 50,000. As the (meth)acrylate oligomers having polyurethane in the skeleton, commercially available products may be used, and examples of the commercially available products include "UA-1" (molecular weight of 2,000) manufactured by Light Chemical Industries Co., Ltd., and the like.

Meanwhile, the weight-average molecular weight of the (meth)acrylate oligomers in the present invention is measured by means of gel permeation chromatography (GPC). Specifically, HLC-8120GPC and SC-8020 (manufactured by Tosoh Corporation) are used, two TSKgel, Super HM-H (manufactured by Tosoh Corporation, 6.0 mmID×15 cm) are used as columns, and tetrahydrofuran (THF) is used as an eluent. In addition, the conditions are set to a specimen concentration of 0.5% by mass, a flow rate of 0.6 mL/min, a sample injection amount of 10 μL, and a measurement temperature of 40° C., and an RI detector is used. Standard curves are produced from ten samples of "polystyrene standard specimen TSK standard" manufactured by Tosoh Corporation: "A-500", "F-1", "F-10", "F-80", "F-380", "A-2500", "F-4", "F-40", "F-128", and "F-700".

Among these, the (meth)acrylate oligomers as the component (A) are particularly preferably (meth)acrylate oligomers having polyisoprene in the skeleton.

In addition, the (meth)acrylate oligomers may be (meth)acrylate oligomers having a hydroxyl group or (meth)acrylate oligomers having no hydroxyl group.

In the radiation-curable gluing agent, the content of the component (A) is preferably in a range of 0.1% by mass to 90% by mass, more preferably in a range of 1% by mass to 65% by mass, and particularly preferably in a range of 10% by mass to 40% by mass.

<<Component (B)>>

The radiation-curable gluing agent in the present invention preferably includes a softening component (B).

Examples of the softening component include polymers, oligomers, phthalic acid esters, castor oils, and the like which are compatible with the component (A). Examples of the oligomers or polymers include polyisoprene-based, polybutadiene-based, or xylene-based oligomers or polymers. As these softening components, commercially available products may be used, and examples of the commercially available products that are on the market include LIR series (for example, L-LIR) manufactured by Kuraray Co., Ltd. and POLYOIL series (for example, POLYOIL 110) manufactured by Degussa AG. These softening components can be used singly or in combination of two or more kinds.

The content of the component (B) is preferably in a range of 10% by mass to 400% by mass, more preferably in a range of 50% by mass to 300% by mass, and still more preferably in a range of 100% by mass to 300% by mass with respect to 100% by mass of the component (A).

<<Component (C)>>

The radiation-curable gluing agent in the present invention preferably includes a polymerization initiator (C). The polymerization initiator is not particularly limited as long as the polymerization initiator is capable of initiating the polymerization of polymerizable compounds such as the above-described oligomers or the above-described softening components and can be appropriately selected from well-known polymerization initiators. For example, polymerization initiators that are radiation-sensitive to light rays having wavelengths in the ultraviolet range to the visible light range are preferred. In addition, the polymerization initiator may be an activator that generates any action with a photoexcited sensitizer and generates active radicals.

Examples of the polymerization initiator include halogenated hydrocarbon derivatives (for example, derivatives having a triazine skeleton, derivatives having an oxadiazole skeleton, and the like), acylphosphine compounds such as acylphosphine oxide, oxime compounds such as hexaarylbiimidazole and oxime derivatives, organic peroxides, thio compounds, ketone compounds, aromatic onium salts, ketoxime ethers, aminoacetophenone compounds, hydroxyacetophenone, and the like.

Specific examples thereof include 1-[4-(2-hydroxyethoxy)phenyl]-2-hydroxy-2-methyl-1-propan-1-one, 1-hydroxy-cyclohexyl-phenyl-ketone, benzophenone, 2,2-dimethoxy-1,2-diphenylethan-1-one, 2,4,6-trimethylbenzoyl diphenyl phosphine oxide, 2,4,6-trimethylbenzoyl phenyl ethoxy phosphine oxide, 2-benzyl-2-dimethylamino-1-(4-morpholinophenyl)butanone-1,2-hydroxy-2-methyl-1-phenyl-propan-1-one, 2-methyl-1-[4-methylthiophenyl]-2-morpholino-propan-1-one, benzoin methyl ether, benzoin ethyl ether, benzoin isobutyl ether, benzoin isopropyl ether, bis(2,4,6-trimethylbenzoyl)-phenylphosphine oxide, 2-hydroxy-2-methyl-[4-(1-methylvinyl) phenyl] propanol oligomer, 2-hydroxy-2-methyl-1-phenyl-1-propanone, isopropylthioxanthone, methyl-o-benzoyl benzoate, [4-(methylphenylthio) phenyl] phenyl methane, 2,4-diethyl thioxanthone, 2-chloro thioxanthone, benzophenone, ethyl anthraquinone, benzophenone ammonium salt, thioxanthone ammonium salts, bis(2,6-dimethoxybenzoyl)-2,4,4-trimethyl-pentyl phosphine oxide, bis(2,6-dimethoxybenzoyl)-2,4,4-trimethyl-pentyl phosphine oxide, 2,4,6-trimethyl benzophenone, 4-methyl benzophenone, 4,4'-bisdiethylamino benzophenone, 1,4-dibenzoyl benzene, 10-butyl-2-chloroacridone, 2,2'-bis(o-chlorophenyl)-4,5,4',5'-tetrakis(3,4,5-trimethoxyphenyl)-1,2'-biimidazole, 2,2'-bis(o-chlorophenyl)-4,5,4',5'-tetraphenyl-1,2'-biimidazole, 2-benzoyl naphthalene, 4-benzoyl biphenyl, 4-benzoyl diphenyl ether, acrylated benzophenone, bis(η5-2,4-cyclopentadien-1-yl)-bis(2,6-difluoro-3-(1H-pyrrol-1-yl)-phenyl) titanium, o-methyl benzoyl benzoate, p-dimethylaminobenzoate ethyl ester, p-dimethylaminobenzoate isoamyl ethyl ester, 3-benzoyloxyiminobutan-2-one, 3-acetoxyiminobutan-2-one, 3-propionyloxy iminobutan-2-one, 2-acetoxyiminopentan-3-one, 2-acethoxyimino-1-phenylpropan-1-one, 2-benzoyloxyimino-1-phenylpropan-1-one, 3-(4-toluenesulfonyloxy) iminobutan-2-one, and 2-ethoxycarbonyloximino-1-phenylpropan-1-one, active tertiary amine, carbazole-phenone-based photopolymerization initiators, acridine-based photopolymerization initiators, triazine-based photopolymerization initiators, benzoyl-based photopolymerization initiators, and the like.

As the polymerization initiator, commercially available products may be used, and, as the commercially available products, IRGACURE-184, DAROCUR-1173, IRGACURE-500, IRGACURE-2959, IRGACURE-127, IRGACURE-907, IRGACURE-369, IRGACURE-379, IRGACURE-819, DAROCUR-TPO, LUCIRIN-TPO, IRGACURE-OXE01, IRGACURE-OXE02 (all manufactured by BASF), and the like can also be preferably used.

Examples of preferred polymerization initiators that are used in the present invention include 2,4,6-trimethyl benzoyl phenylethoxy phosphine oxide, 1-hydroxycyclohexyl phenyl ketone, and LUCIRIN-TPO, and these polymerization initiators may be used singly or in combination.

The polymerization initiators can be used singly or in combination of two or more kinds. The content of the polymerization initiator is preferably in a range of 0.1 parts by mass to 50 parts by mass, more preferably in a range of 1 part by mass to 35 parts by mass, and still more preferably in a range of 5 parts by mass to 20 parts by mass with respect to 100 parts by mass of the component (A).

<<Component (D) and Component (E)>>

The radiation-curable gluing agent in the present invention preferably further includes at least one of a (meth) acrylate monomer (D) and a thiol compound (E).

The (meth)acrylate monomer (D) is selected from, for example, phenoxyethyl (meth)acrylate (PO), phenoxy polyethylene glycol (meth)acrylate, 2-hydroxy-3-phenoxypropyl (meth)acrylate, cyclohexyl (meth)acrylate (CH), nonylphenol ethylene oxide adduct (meth)acrylate, methoxy triethylene glycol (meth)acrylate and tetrahydrofurfuryl (meth)acrylate, 2-ethylhexyl (meth)acrylate, n-butyl (meth)acrylate, i-butyl (meth)acrylate, t-butyl (meth)acrylate, lauryl (meth)acrylate, alkyl (meth)acrylate, methoxyethyl (meth)acrylate, 2-hydroxyethyl (meth)acrylate, 2-hydroxypropyl (meth)acrylate, 2-hydroxybutyl (meth)acrylate, benzyl (meth)acrylate, phenyl (meth)acrylate, ethylene glycol di(meth)acrylate, diethylene glycol di(meth)acrylate, triethylene glycol di(meth)acrylate, hydroxyethyl (meth)acrylate, 1,3-butylene glycol di(meth)acrylate, 1,4-butylene glycol di(meth)acrylate, neopentyl glycol di(meth)acrylate, 1,6-hexanediol di(meth)acrylate, dicyclopentenyloxyethyl (meth)acrylate, norbornene (meth)acrylate, isobornyl (meth) acrylate, and lauryl acrylate. These (meth)acrylate monomers can be used singly or in combination of two or more kinds.

Examples of the thiol compound include tridecyl mercaptopropionate, methoxybutyl mercaptopropionate, octyl mercaptopropionate, dodecanethiol, trimethylolpropane tris thiopropionate, pentaerythritol tetrakis thiopropionate, dipentaerythritol hexakis (3-mercaptopropionate), tris[(3-mercaptopropionyloxy)-ethyl] isocyanurate, 3-mercapto butyrate derivatives, and the like. These thiol compounds can be used singly or in combination of two or more kinds.

The component (E) is preferably tridecyl mercaptopropionate, dodecanethiol, or a 3-mercapto butyrate derivative, and specific examples thereof include tridecyl mercaptopropionate, dodecanethiol, 1,4-bis(3-mercapto butyryloxy) butane, 1,3,5-tris(3-mercaptobutyloxyethyl)-1,3,5-triazine-2,4,6-(1H,3H,5H)-trione, pentaerythritol tetrakis(3-mercapto butyrate), trimethylolpropane tris(3-mercaptopropionate), and the like. As these thiol compounds, commercially available products may be used, and examples thereof include KARENZMT BD1, KARENZMT PE1, KARENZMT NR1 (all manufactured by Showa Denko K.K.), and a TMMP (manufactured by Sakai Chemical Industry Co., Ltd.).

In a case in which the radiation-curable gluing agent is a (meth)acrylate monomer, the content of the (meth)acrylate monomer is preferably in a range of 1 part by mass to 200 parts by mass and more preferably in a range of 50 parts by mass to 150 parts by mass with respect to 100 parts by mass of the component (A).

In a case in which the radiation-curable gluing agent is a thiol compound, the content of the thiol compound is preferably in a range of 0.05 parts by mass to 100 parts by mass and more preferably in a range of 0.1 parts by mass to 10 parts by mass with respect to 100 parts by mass of the component (A).

<<Component (F)>>

The radiation-curable gluing agent in the present invention may further include an adhesion promoter. The adhesion promoter refers to a substance having a function of improving adhesiveness by affecting the viscosity or plasticity, dispersibility, and the like in the radiation-curable gluing agent.

As the adhesion promoter, for example, silane coupling agents can be exemplified. Specific examples thereof include vinyl trimethoxysilane, 2-(3,4-epoxycyclohexyl) ethyl trimethoxysilane, 3-glycidoxypropyl trimethoxysilane, 3-glycidoxypropyl methyl diethoxysilane, 3-glycidoxypropyl triethoxysilane, p-styryl trimethoxysilane, 3-methacryloxypropyl methyl dimethoxysilane, 3-methacryloxypropyl trimethoxysilane, 3-methacryloxypropyl methyl diethoxysilane, 3-methacryloxypropyl triethoxysilane, 3-acryloxypropyl trimethoxysilane, N-2-(aminoethyl)-3-aminopropyl methyl dimethoxysilane, N-2-(aminoethyl)-3-aminopropyltrimethoxysilane, N-2-(aminoethyl)-3-aminopropyltriethoxysilane, 3-aminopropyltrimethoxysilane, 3-aminopropyltriethoxysilane, 3-triethoxysilyl-N-(1,3-dimethyl-butylidene) propylamine, N-phenyl-3-aminopropyltrimethoxysilane, 3-ureidopropyltriethoxysilane, 3-chloropropyl trimethoxysilane, 3-mercaptopropyl methyl dimethoxysilane, 3-mercaptopropyltrimethoxysilane, bis(triethoxysilylpropyl) tetrasulfide, 3-isocyanatopropyl triethoxysilane, and the like.

In addition, as the adhesion promoter, in addition to the silane coupling agents, terpene-based hydrides may be used. Specific examples of the terpene-based hydrides include CLEARON series such as CLEARON-P85, CLEARON-P125, and CLEARON-P135 (manufactured by Yasuhara Chemical Co., Ltd.), and the like.

These adhesion promoters can be used singly or in combination of two or more kinds.

In a case in which the radiation-curable gluing agent includes the adhesion promoter, the content of the adhesion promoter is preferably in a range of 0.01 parts by mass to 300 parts by mass and more preferably in a range of 0.5 parts by mass to 200 parts by mass with respect to 100) parts by mass of the component (A).

<<Component (G)>>

The radiation-curable gluing agent in the present invention may further include an antioxidant. Examples of the antioxidant include dibutylated hydroxytoluene (BHT), 2,4-bis-(n-octylthio)-6-(4-hydroxy-3,5-di-t-butylanilino)-1,3,5-triazine, pentaerythrityl-tetrakis [3-(3,5-di-t-butyl-4-hydroxyphenyl) propionate], 2,2-thio-diethylene bis[3-(3,5-di-t-butyl-4-hydroxyphenyl) propionate], triethylene glycol-bis [3-(3-t-butyl-5-methyl-4-hydroxyphenyl) propionate], 1,6-hexanediol-bis[3-(3,5-di-t-butyl-4-hydroxyphenyl) propionate], octadecyl-3-(3,5-di-t-butyl-4-hydroxyphenyl) propionate, N,N'-hexamethylene bis(3,5-di-t-butyl-4-hydroxy-hydrocinnamamide), 1,3,5-trimethyl-2,4,6-tris(3,5-di-t-butyl-4-hydroxybenzyl) benzene, tris-(3,5-di-t-butyl-4-hydroxybenzyl)-isocyanurate, octylated diphenylamine, 2,4-bis[(octylthio)methyl]-o-cresol, isooctyl-3-(3,5-di-t-butyl-4-hydroxyphenyl) propionate, and pentaerythrityl.tetrakis [3-(3,5-di-t-butyl-4-hydroxyphenyl) propionate] (IR-GANOX-1010 (manufactured by Ciba Specialty Chemicals Inc.) as a commercially available product).

These antioxidants can be used singly or in combination of two or more kinds.

In a case in which the radiation-curable gluing agent includes the antioxidant, the content of the antioxidant is preferably in a range of 0.01 parts by mass to 10 parts by mass and more preferably in a range of 0.5 parts by mass to 5 parts by mass with respect to 100 parts by mass of the component (A).

<<Other Materials>>

To the radiation-curable adhesive, other additives can be added as long as the objects of the present invention are not impaired. Examples of the additives include a surfactant, an ultraviolet absorbent, a lubricant, and an antistatic agent.

As the radiation-curable gluing agent in the present invention, it is possible to use an adhesive composition in which both light curing and thermal curing are jointly used so that, in a case in which light fails to hit part of the adhesive composition applied to an adhesion surface due to the structure of an optical function material, portions that light hits are cured by light and portions that light does not hit are thermally cured by adding an organic peroxide thereto. Examples of the organic peroxide include ketone peroxide-based organic peroxides, peroxyketal-based organic peroxides, hydroperoxide-based organic peroxides, dialkyl peroxide-based organic peroxides, diacyl peroxide-based organic peroxides, peroxy ester-based peroxides, peroxy dicarbonate-based organic peroxides, and the like. These organic peroxides can be used singly or in combination of two or more kinds. In a case in which the radiation-curable gluing agent includes the organic peroxide, the content of the organic peroxide is preferably in a range of 0.1 parts by mass to 10 parts by mass and more preferably in a range of 1 part by mass to 5 parts by mass with respect to 100 parts by mass of the component (A). In addition, as a curing accelerator of the organic peroxide, it is possible to use naphtene acid metal complexes, dimethylaniline, quaternary ammonium salts, and phosphoric acid esters.

<Pressure-sensitive Adhesive Microcapsule and Method for Manufacturing Same>

An ordinary method for encapsulating a target compound in a microcapsule is a method in which the target compound is dissolved in a hydrophobic solvent (oil phase), this oil phase is added to an aqueous solution (water phase) dissolved in which a water-soluble polymer, the oil phase is emulsified and dispersed using a homogenizer or the like, and simultaneously, a monomer or a prepolymer which serves as a wall material of the microcapsule is added to any one of the oil phase side and the water phase side, thereby causing a polymerization reaction at an interface between the oil phase and the water phase or forming a polymer wall of the microcapsule by precipitating the polymer, thereby manufacturing the microcapsule (for example, refer to "Microcapsule" by Asaji Kondo, Nikkan Kogyo Shimbun Ltd. (published on 1970) and "Microcapsule" by Tamotsu Kondo, Sankyo Shuppan Co., Ltd. (published on 1977)). In this case, as the wall film (polymer film) of the microcapsule, crosslinked gelatin, alginate, cellulose, polyurea resins, polyurethane resins, melamine resins, nylon resins, and the like can be used.

A method for manufacturing the pressure-sensitive adhesive microcapsule of the present invention is not particularly limited, examples thereof include a coacervation method, an interfacial polymerization method, an internal polymerization method, an external polymerization method, and the like, and any methods can be employed.

The wall film of the microcapsule is preferably constituted of a polymer. Preferably, it is possible to employ an interfacial polymerization method in which a radiation-curable gluing agent which can serves as the core of the capsule or an oil phase prepared by dissolving and dispersing a radiation-curable gluing agent in a hydrophobic organic solvent is injected into a water phase in which a water-soluble polymer is dissolved, the radiation-curable gluing agent or the oil phase is emulsified and dispersed using stirring means such as a homogenizer, and then is heated so as to cause a polymer-forming reaction at an oil droplet interface, thereby forming a wall film of the microcapsule which is made of a polymer.

Here, the interfacial polymerization method is a method in which a polyurea-polyurethane resin film obtained by mainly reacting a polyisocyanate compound and water, a polyamine, or a polyalcohol is used, and a different kind of monomer from both a dispersion medium and a core substance (a dispersed phase) dispersed in the dispersion medium is respectively added to the dispersion medium and the core substance, and a capsule film of a polymer is formed at the interface therebetween, that is, the surface of the core substance. For example, a polyisocyanate compound is added to a hydrophobic solution of a core substance and is emulsified and dispersed in an aqueous solution of polyvinyl alcohol, an emulsifier-containing solution, or the like, and then the polyisocyanate compound is polymerization-reacted with water, polyamines, polyalcohol, or the like, thereby forming a polyurea-polyurethane resin film. This method has advantages that manufacturing steps are simple and high-concentration capsules can be obtained.

Here, the polyurea-polyurethane resin film is a film in which a polyisocyanate compound, a polyurea chemical structure generated by water or polyamines, and a polyurethane chemical structure generated by a polyisocyanate compound and a polyalcohol are used for the wall film of the microcapsule and is a complex compound-structured film thereof (composite wall).

Specific examples of the polymer that forms the wall film of the microcapsule include polyurethane, polyurea, polyamides, polyesters, polycarbonates, urea-formaldehyde resins, melamine resins, polystyrene, styrene methacrylate copolymers, styrene-acrylate copolymer, and the like. Among these, polyurethane, polyurea, polyamides, polyesters or polycarbonates are preferred, and, particularly, polyurethane and polyurea are preferred.

For example, in a case in which polyurea is used as a wall material of the microcapsule, it is possible to easily form a microcapsule wall by reacting a polyisocyanate compound such as diisocyanate, triisocyanate, tetraisocyanate, or a polyisocyanate prepolymer, a polyamine such as a diamine, triamine, or tetraamine, a prepolymer having two or more amino groups, piperazine or a derivative thereof or a polyol in the water phase using an interfacial polymerization method.

In addition, for example, the composite wall made of polyurea and polyamide or the composite wall made of polyurethane and polyamide can be prepared by, for example, mixing a polyisocyanate compound and a second substance which reacts with the polyisocyanate compound and thus form a wall film of a microcapsule (for example, acid chloride, polyamine, or polyol) in an aqueous solution of a water-soluble polymer (water phase) or an oily medium (oil phase) which is to be capsulated, emulsifying and dispersing the mixture, and then heating the mixture. The details of the method for manufacturing the composite wall made of polyurea and polyamide are described in, for example, JP1983-66948A (JP-S58-66948A).

As the polyisocyanate compound, a compound having a tri- or higher-functional isocyanate group is preferred, but a bifunctional isocyanate compound may be jointly used. Specific examples thereof include diisocyanates such as xylene diisocyanate and hydrogenated substances thereof, hexamethylene diisocyanate, tolylene diisocyanate and hydrogenated substances thereof, and isophorone diisocyanate, dimers or timers thereof (biuret or isocyanurate), additionally, adducts (polyfunctionalized isocyanate compounds) of a polyol such as trimethylolpropane and a bifunctional isocyanate such xylylene diisocyanate, compounds obtained by introducing a polymer compound such as a polyether having active hydrogen such as polyethylene oxide into an adduct (polyfunctionalized isocyanate compound) of a polyol such as trimethylol propane and a bifunctional isocyanate such as xylyene diisocyanate; formalin condensates of benzene isocyanate; and the like. Compounds described in JP1987-212190A (JP-S62-212190A) JP1992-26189A (JP-H04-26189A), JP1993-317694A (JP-H05-317694A), JP1998-114153A (JP-H10-114153A), and the like are preferred.

In the present invention, as the polyisocyanate compound, a water-dispersible isocyanate is preferably used. The water-dispersible isocyanate is a compound obtained by adding a hydrophilic functional group such as alkylene oxide mainly to a polymer of the polyisocyanate compound such as a hexamethylene diisocyanate compound (HDI) and is compatible with water.

The water-dispersible isocyanate that is used in the present invention is specifically a polyisocyanate compound having dispersibility in water which is enhanced by adding a nonionic functional group such as ethylene oxide mainly to an aliphatic, alicyclic, or aromatic polyisocyanate compound or a derivative thereof. Examples of the water-dispersible polyisocyanate compound include reaction products between an aliphatic polyisocyanate compound and a monohydric or polyhydric nonionic polyalkylene ether alcohol including at least one polyether chain having at least 10 ethylene oxide units, described in JP1995-30160B (JP-H07-30160B); partially-urethanated compositions of a monohydric or polyhydric alcohol including a polyether chain having an average of 7 to 25 alkylene oxide units, at least 70% of which are ethylene oxide units and 2,4- and/or 2,6-diisocyanatotoluene, described in JP1995-109327A (JP-H10-109327A); modified polyisocyanate compounds constituted of a reaction product between a polyisocyanate compound and a nonionic emulsifier which has active hydrogen atoms that are reactive to isocyanate groups, has a hydrophilic-lipophilic balance (HLB) of 17 or lower, and includes an average of 15 to 35 ethylene oxide units in a single molecule, described in JP1999-310700A (JP-H11-310700A); and the like, but the water-dispersible polyisocyanate compound is not limited thereto.

Examples of the polyisocyanate compound used to obtain the water-dispersible polyisocyanate compound include, mainly, aliphatic, alicyclic, or aromatic polyisocyanate compounds and derivatives thereof, and, among these, aliphatic or alicyclic polyisocyanate compounds and derivatives thereof are preferred. Examples of the aliphatic or alicyclic polyisocyanate compounds include polyisocyanate compounds exemplified by 1) to 5) below.

1) Isocyanurate group-containing polyisocyanate compounds in which aliphatic and/or alicyclic diisocyanate compounds are used as base materials Specific examples thereof include isocyanatoisocyanurate in which 1,6-diisocyanate hexane and/or 1-isocyanato-3,3,5-trimethyl-5-isocyanatomethyl-cyclohexane (isophorone diisocyanate compound=IPDI) are used as base materials. Methods for preparing the above-described compounds are described in, for example, DE2,616,416B, EP3,765A, EP10,589A, EP47,452A, U.S. Pat. Nos. 4,288,586A, and 4,324,879A.

In addition, examples thereof also include isocyanurate group-containing polyisocyanate compounds which are represented by the following formula in which other aliphatic and/or alicyclic diisocyanate compounds are used as base materials. This is simple tris-isocyanatoalkyl-(or-cycloalkyl-)isocyanurate or a mixture of tris-isocyanatoalkyl-(or-cycloalkyl-)isocyanurate and a higher homologue thereof (including more than one isocyanurate rings).

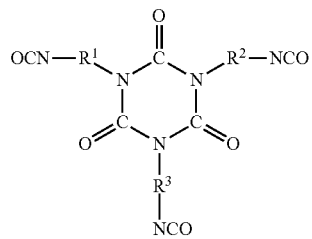

(In the formula, each of $R^1$, $R^2$, and $R^3$ independently represents an identical or different hydrocarbon group obtained by removing an isocyanate group from a diisocyanate compound which is a starting material.)

2) Uretdione diisocyanate compounds having an isocyanate group bonded to an aliphatic and/or an alicyclic compound, which are represented by the following formula.

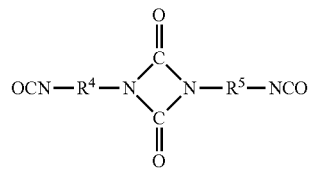

(In the formula, $R^4$ and $R^5$ are identical to $R^1$, $R^2$, and $R^3$ and preferably represent hydrocarbon groups obtained by removing an isocyanate group from a hexamethylene diisocyanate compound and/or IPDI.)

The uretdione diisocyanate compounds are capable of being present singly or as a mixture with another aliphatic polyisocyanate compound, particularly, the isocyanurate group-containing polyisocyanate compound described in 1).

3) Biuret group-containing polyisocyanate compounds having an isocyanate group bonded to an aliphatic compound, that is, tris-(6-isocyanatohexyl)-biuret or a mixture of tris-(6-isocyanatohexyl)-biuret and a higher homologue thereof.

4) Urethane group and/or allophanate group-containing polyisocyanate compounds having an isocyanate group bonded to an aliphatic or an alicyclic compound, that is, isocyanate compounds obtained by reacting an excess amount of a hexamethylene diisocyanate compound or IPDI with a simple polyhydric alcohol (for example, trimethylolpropane, glycerin, 1,2-dihydroxypropane, or a mixture thereof).

5) Oxadiazinetrione group-containing polyisocyanate compounds having an isocyanate group bonded to an aliphatic or an alicyclic compound, which are represented by the following formula.

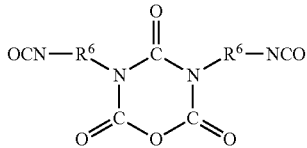

(In the formula, $R^6$ is identical to $R^1$, and, preferably, the polyisocyanate compound is generated from 1,6-diisocyanatohexane and carbon dioxide, and $R^6$ is a hexamethylene group.)

The aliphatic or alicyclic polyisocyanate compounds represented by 1) to 5) are capable of being present singly or as a mixture as desired. Meanwhile, the "aliphatic polyisocyanate compound" mentioned in the present invention represents a polyisocyanate compound in which an isocyanate compound is bonded to an aliphatic or alicyclic carbon atom.

In addition, examples of isocyanate compounds for obtaining the aromatic polyisocyanate compounds include 2,4- and/or 2,6-toluene diisocyanate, 4,4'-diphenylmethane diisocyanate, and the like.

Examples of nonionic functional groups such as ethylene oxides which are added to the polyisocyanate compound include ethylene oxide unit-containing polyether alcohols. In order to manufacture appropriate polyether alcohols, alkoxylated products (containing at least one polyether chain having at least 10, generally 10 to 70, and preferably 15 to 65 ethylene oxide units) of a monohydric or polyhydric initiator molecule, for example, methanol, n-butanol, cyclhexanol, 3-methyl-3-hydroxymethyloxetane, phenol, resorcinol, ethylene glycol, propylene glycol, aniline, trimethylolpropane, or glycerin are used.

The water-dispersible isocyanate is manufactured by reacting a hydrophilic compound containing a group capable of reacting with an isocyanate compound, preferably, the above-described ethylene oxide unit-containing polyether alcohol with the above-described aliphatic, alicyclic, or aromatic polyisocyanate compound or a derivative thereof at an NCO/OH equivalent ratio of at least approximately 1:1 and preferably approximately 2:1 to approximately 1,000:1. Particularly, in a case in which a polyhydric polyether alcohol is used, an NCO/OH equivalent ratio of at least approximately 2:1 is used.

The water-dispersible isocyanate is prepared at a temperature of approximately 50° C. to 130° C.

Furthermore, when the pressure-sensitive adhesive microcapsule of the present invention is produced, it is also possible to add polyols, polyamines, and the like in addition to the water-dispersible isocyanate. Examples of the polyols include polyhydric alcohols, alkylene oxide adducts of polyhydric alcohols, and the like. Examples of the polyhydric alcohols include ethylene glycol, diethylene glycol, propylene glycol, dipropylene glycol, 1,3-butanediol, 1,4-butanediol, 1,5-pentanediol, 1,6-hexanediol, resorcinol, glycerine, diglycerine, trimethylol propane, trimethylol ethane, pentaerythritol, dipentaerythritol, methyl glucoside, sorbitol, and compounds having two or more hydroxyl groups such as polysaccharides, for example, sucrose. Examples of the polyamines include alkylene polyamines such as ethylenediamine, propylenediamine, hexamethylenediamine, octamethylenediamine, para-phenylenediamine, piperazine, diethylenetriamine, triethylenetetramine, and tetraethylenepentamine; alkanolamines such as monoethanolamine, diethanolamine, triethanolamine, isopropanolamine, and isobutanol amine; and the like.

In the present invention, water-dispersible isocyanate in which the proportion of NCO groups in the water-dispersible isocyanate is in a range of 6% to 24% and more preferably in a range of 8% to 20% is desirable. Examples of the products of the above-described water-dispersible isocyanate include TAKENATE WD Series (WD-730 and the like) manufactured by Mitsui ChemicalsInc., BAYHYDUR series manufactured by Sumika Bayer Urethane Co. Ltd., and the like.

The amount of the water-dispersible isocyanate used is in a range of approximately 0.001 times to 1 time (mass ratio) and preferably in a range of approximately 0.002 times to 0.3 times (mass ratio) of the radiation-curable gluing agent.

In the present invention, it is possible to use a variety of crosslinking agents in addition to the water-dispersible isocyanates. Examples of the crosslinking agents include polyhydric amines, polyhydric hydroxy compounds, and the like. Examples of the polyhydric amines include aliphatic polyhydric amines such as ethylenediamine, diethylenetriamine, triethylenetetramine, tetraethylenepentamine, 1,3-propylenediamine, and hexamethylenediamine, aromatic polyhydric amines such as phenylenediamine, diaminonaphthalene, and xylene diamine, alicyclic polyhydric amines such as piperazine, and the like, and these polyhydric amines can be used singly or jointly. Examples of the polyhydric hydroxy compounds include aliphatic or aromatic polyhydric alcohols, hydroxy polyesters, hydroxy polyalkylene ethers, and alkylene oxide adducts of polyhydric amines.

The amount of these crosslinking agents added can be adjusted to an appropriate multiple number of the water-dispersible isocyanate compound in accordance with intended properties of the pressure-sensitive adhesive microcapsule and is, for example, in a range of approximately 0.01 times to 1 time (mass ratio) of the water-dispersible isocyanate compound.

In the pressure-sensitive adhesive microcapsule of the present invention, it is possible to improve the adsorbing function of the water-dispersible isocyanate compound to the surfaces of adhesives by adding a surfactant. Examples of the surfactant that can be used include nonionic surfactants having a polyoxyethylene chain or a hydroxyl group and anionic surfactants such as polyacrylic acid-based copolymers, polystyrene acrylate-based copolymers, polystyrene maleic anhydride-based copolymers, polystyrene sulfonate-based copolymers, and isobutylene maleic anhydride-based copolymers. Nonionic surfactants are more preferred. Surfactants having a HLB value in a range of approximately 1 to 10 are preferred. Here, the HLB value refers to an index indicating the balance between the hydrophilic properties and the lipophilic properties of nonionic surfactants which is established by Griffin, Davies, et. al. (W. G. Griffin: J. Soc. Cosmetic Chem., 1,311 (1949), 5,249 (1954), J. T. Davies & E. K. Rideal: "Interfacial Phenomena" Academic Press, New York (1961), p. 366) and is obtained from chemical structures by means of calculation. The HLB value generally in a range of 0 to 20, and, as the numeric value decreases, the lipophilic properties become more favorable. In addition, in a case in which an anionic surfactant is used, there are cases in which adhesive emulsion is agglomerated, and thus it is necessary to take caution in the composition of the adhesive emulsion and the combination of the surfactants.

Examples of preferred surfactants include sodium alkyl benzene sulfonate, sodium alkyl sulfate, sodium dioctyl sulfosuccinate, polyalkylene glycol (for example, polyoxyethylene nonylphenyl ether), and the like.

The amount of the surfactant added can be adjusted to an appropriate multiple number of the radiation-curable gluing agent in accordance with intended properties of the pressure-sensitive adhesive microcapsule and is, for example, in a range of approximately 0.001 times to 0.2 times (weight ratio) of the radiation-curable gluing agent.

In addition, to the wall film of the microcapsule, it is possible to add metal-containing dyes, charge regulators such as nigrosine, or other arbitrary additive substances as necessary. These additives can be added to the wall film of the microcapsule during the formation of the wall or at an arbitrary point in time. In addition, in order to adjust the charging properties of the wall film surface of the microcapsule as necessary, monomers such as vinyl monomers may be graft-polymerized.

An oil phase containing the above-described components and a water phase containing protective colloid and a surfactant can be easily emulsified using stirring means that is used for ordinary fine particle emulsification such as high-speed stirring or ultrasonic dispersion, for example, a well-known emulsifier such as a homogenizer, a Manton-Gaulin, an ultrasonic disperser, a dissolver, or a Kady mill. After the emulsification, in order to accelerate the wall film-forming reaction of the microcapsule, it is preferable to heat the emulsion at a temperature in a range of 30° C. to 70° C. In addition, in order to prevent the capsules from being agglomerated during the reaction, it is preferable to add water so as to decrease the collision probability between the capsules or sufficiently stir the capsules.

In addition, a dispersion for preventing agglomeration during the wall film-forming reaction of the microcapsule may be added thereto. As a polymerization reaction proceeds, the generation of carbon dioxide is observed, and it is possible to consider the end of the generation thereof as the terminal point of the wall-forming reaction of the capsule. Generally, intended microcapsules can be obtained after several hours of the reaction.

In order to maintain the transparency of gluing sheets, the average particle diameter in the pressure-sensitive adhesive microcapsule of the present invention is smaller than 500 μm, preferably in a range of 1 μm to smaller than 500 μm, more preferably in a range of 3 μm to 200 μm, and still more preferably in a range of 5 μm to 100 μm.

The average particle diameter in the pressure-sensitive adhesive microcapsule can be obtained by, for example, dropping a pressure-sensitive adhesive microcapsule-containing liquid on a glass slide, measuring the diameters (the observed longest lengths) of arbitrary 20 particles using an optical microscope, and computing the average value thereof.

(Pressure-sensitive Adhesive Microcapsule-containing Liquid)

A pressure-sensitive adhesive microcapsule-containing liquid of the present invention is a liquid including the pressure-sensitive adhesive microcapsule and a binder.

In the present specification, it is possible to manufacture the pressure-sensitive adhesive microcapsule-containing liquid of the present invention by mixing a solution of the above-described binder, the radiation-curable gluing agent, and the wall material of the pressure-sensitive adhesive microcapsule and producing capsules.

<Binder>

As the binder used in the present invention, an emulsion or the like of a commonly-used water-soluble polymer or hydrophobic polymer can be appropriately used. As specific examples, it is possible to use emulsions of polyvinyl alcohols, polyvinyl acetal, cellulose derivatives such as hydroxyethyl cellulose, methyl cellulose, and carboxymethyl cellulose, starch and derivatives thereof, acrylic acid, sodium polyacrylate, polyvinyl pyrrolidone, water-soluble polymers such as acrylic acid amide/acrylic acid ester copolymers, acrylic acid amide/acrylic acid ester/methacrylic acid copolymers, styrene/maleic anhydride copolymer alkali salts, isobutylene/maleic anhydride copolymer alkali salts, polyacrylamide, sodium alginate, gelatin, and casein, and hydrophobic polymers such as polyvinyl acetate, polyurethane, styrene/butadiene copolymers, polyacrylic acid, polyacrylic acid esters, vinyl chloride/vinyl acetate copolymers, polybutyl methacrylate, ethylene/vinyl acetate copolymers, and styrene/butadiene/acrylic copolymers.

The amount of the binder used is preferably in a range of 0 parts by mass to 100 parts by mass, more preferably in a range of 15 parts by mass to 80 parts by mass, and still more preferably in a range of 30 parts by mass to 60 parts by mass with respect to 100 parts by mass of the pressure-sensitive adhesive microcapsule.

<Other Materials>

To the pressure-sensitive adhesive microcapsule-containing liquid, it is possible to add other additives as long as the objects of the present invention are not impaired. Examples of the additives include an antioxidant, a surfactant, an ultraviolet absorbent, a lubricant, and an antistatic agent.

As the content of the radiation-curable gluing agent encapsulated in the pressure-sensitive adhesive microcapsule decreases, the initial gluing force (the gluing force until pressure is applied) weakens, and the fluidity improves. On the other hand, as the content of the radiation-curable gluing agent increases, the gluing force when pressure is applied strengthens, and the gluing force improves. Therefore, the content of the radiation-curable gluing agent is preferably in a range of 30%° by mass to 100% by mass, more preferably in a range of 45% by mass to 90% by mass, and still more preferably in a range of 50% by mass to 75% by mass of the total mass of the radiation-curable gluing agent, the material constituting the wall material of the pressure-sensitive adhesive microcapsule, and the binder. When the content is in a range of 30% by mass to 100% by mass, it is possible to satisfy both the absence of the initial gluing force and the presence of the gluing force when pressure is applied.

In addition, the content of the water-dispersible isocyanate in the pressure-sensitive adhesive microcapsule-containing liquid of the present invention is preferably in a range of 0.05% by mass to 17.0% by mass and more preferably in a range of 0.18% by mass to 5.8% by mass of the total solid content of the pressure-sensitive adhesive microcapsule-containing liquid.

(Gluing Sheet and Method for Manufacturing Same)

A gluing sheet of the present invention includes a layer including the pressure-sensitive adhesive microcapsule of the present invention on a support.

The support that is used in the gluing sheet of the present invention is not particularly limited as long as the support is capable of supporting the layer including the pressure-sensitive adhesive microcapsule, and examples thereof include paper such as ink jet paper, high-quality paper, coated paper, recycled paper, and synthetic paper, films such as polyethylene terephthalate (PET), nonwoven fabrics, and the like.

A method for forming the layer including the pressure-sensitive adhesive microcapsule on the support is not particularly limited, but it is preferable to form the layer by applying the pressure-sensitive adhesive microcapsule-containing liquid onto the support. Examples of the coating method include blade coating, air-knife coating, roll coating, bar coating, gravure coating, reverse coating, hopper coating, and the like. The coating amount is not particularly limited as long as the coating amount is appropriately set in accordance with a desired gluing force or desired aspects of products and is, for example, in a range of 3 g/m² to 100 g/m² and more preferably in a range of 10 g/m² to 60 g/m².

After the pressure-sensitive adhesive microcapsule-containing liquid is applied onto the support, it is preferable to evaporate moisture by heating the pressure-sensitive adhesive microcapsule-containing liquid. The heating temperature is preferably approximately 100° C., and the heating (drying) duration is preferably approximately two minutes.

Furthermore, after the pressure-sensitive adhesive microcapsule-containing liquid is applied onto the support, it is preferable to carry out radiation irradiation on the pressure-sensitive adhesive microcapsule. When radiation irradiation is carried out, the radiation-curable gluing agent in the pressure-sensitive adhesive microcapsule falls into a state of being provided with a gluing force. When the gluing sheet of the present invention is highly compressed (glued), the pressure-sensitive adhesive microcapsule is broken, and thus the radiation-curable gluing agent in the pressure-sensitive adhesive microcapsule is discharged outside the microcapsule, and thus a gluing force is exhibited.

In the present invention, it becomes possible to control the gluing force and the fluidity of the gluing sheet of the present invention by controlling the irradiation amount of radiation. The irradiation amount of radiation (the exposure amount) is preferably in a range of 10 mJ/cm² to 5,000 mJ/cm², more preferably in a range of 100 mJ/cm² to 4,000 mJ/cm², and still more preferably in a range of 250 mJ/cm² to 3,000 mJ/cm².

In the gluing sheet of the present invention, protrusions and recesses are formed using the pressure-sensitive adhesive microcapsule on the surface of the layer including the pressure-sensitive adhesive microcapsule. Means for forming protrusions and recesses is not particularly limited; however, preferably, the protrusions and recesses can be formed by setting the average film thickness of the layer including the pressure-sensitive adhesive microcapsule to be smaller than the average particle diameter in the pressure-sensitive adhesive microcapsule. The formation of protrusions and recesses enables the easy identification of the surface of the gluing agent of the present invention on the support side and the surface of the layer including the pressure-sensitive adhesive microcapsule. In addition, when the average film thickness of the layer including the pressure-sensitive adhesive microcapsule is smaller than the average particle diameter in the pressure-sensitive adhesive microcapsule, the pressure-sensitive adhesive microcapsule breaks even at a weak pressure, and the gluing force is exhibited.

The average film thickness of the layer including the pressure-sensitive adhesive microcapsule is preferably in a range of 1 μm to 50 μm, more preferably in a range of 3 μm to 40 μm, still more preferably in a range of 5 μm to 30 μm, and particularly preferably in a range of 5 μm to 20 μm.

In addition, the difference between the average particle diameter in the pressure-sensitive adhesive microcapsule and the average film thickness of the layer including the pressure-sensitive adhesive microcapsule is preferably 10 μm or greater, more preferably 20 μm or greater, and still more preferably 30 μm or greater. The upper limit thereof is not particularly limited and is 100 μm or smaller.

The average film thickness of the layer including the pressure-sensitive adhesive microcapsule can be measured by cutting the coated film using a microtome and observing the film thicknesses using an optical microscope.

The total light transmittance of the gluing sheet of the present invention is preferably in a range of 70% to 100%, more preferably in a range of 80% to 100%, and still more preferably in a range of 85% to 100%.

The total light transmittance can be measured using, for example, a haze meter NDH2000 type manufactured by Nippon Denshoku Industries, Co., Ltd.

(Method for Manufacturing Laminate)

The present invention relates to a method for manufacturing a laminate including gluing the gluing sheet according and an adherend by bringing the surface of the layer including the pressure-sensitive adhesive microcapsule in the gluing sheet and the adherend into contact with each other and compressing them together.

According to the method for manufacturing a laminate, when the adherend is compressed through the gluing sheet of the present invention, the pressure-sensitive adhesive microcapsule on the gluing sheet of the present invention breaks, and thus a gluing force is exhibited, and the adherend can be glued to the surface of the layer. The adherend is not particularly limited, and examples thereof include paper such as ink jet paper, high-quality paper, coated paper, recycled paper, and synthetic paper, films such as polyethylene terephthalate (PET), nonwoven fabrics, and the like.

EXAMPLES

Hereinafter, the characteristics of the present invention will be described more specifically using examples and comparative examples. Materials, amounts used, fractions, treatment contents, treatment orders, and the like described in the following examples can be appropriately modified within the scope of the gist of the present invention. Therefore, the scope of the present invention should not be interpreted in a limited manner by the examples described below.

Examples 1 to 7

Manufacturing of Radiation-curing Gluing Agent

Components shown in the following table are formulated at amounts shown in the following table (parts by mass), thereby obtaining radiation-curable gluing agents A to C.

TABLE 1

| Component | Radiation-curable gluing agent A | Radiation-curable gluing agent B | Radiation-curable gluing agent C |
|---|---|---|---|
| UC-1 | 100 | 100 | 100 |
| QM657 | 52.4 | 52.4 | 28.6 |
| AMP-20GY | 28.6 | 0 | 0 |
| MTG-A | 0 | 28.6 | 0 |
| LA | 0 | 0 | 52.4 |
| LUCIRIN TPO | 4.8 | 4.8 | 4.8 |
| IRGACURE 184 | 9.5 | 9.5 | 9.5 |

TABLE 1-continued

| Component | Radiation-curable gluing agent A | Radiation-curable gluing agent B | Radiation-curable gluing agent C |
|---|---|---|---|
| POLYOIL 110 | 195.2 | 195.2 | 195.2 |
| L-LIR | 81.0 | 81.0 | 81.0 |
| IRGANOX 1010 | 4.8 | 4.8 | 4.8 |
| Total | 476.3 | 476.3 | 476.3 |

Abbreviations in the table respectively represent the following compounds.

UC-1: Polyisoprene methacrylate oligomer, the molecular weight of 25,000 (manufactured by Kuraray Co., Ltd.)

QM657: Dicyclopentenyloxy ethyl metacrylate (manufactured by Rohm and Haas Japan)

AMP-20GY: Phenoxypolyethylene glycol acrylate (manufactured by Shin-Nakamura Chemical Co., Ltd.)

MTG-A: Methoxy triethylene glycol acrylate (manufactured by Kyoeisha Chemical Co., Ltd.)

LA: Lauryl acrylate (manufactured by Kyoeisha Chemical Co., Ltd.)

LUCIRIN-TPO: 2,4,6-Trimethyl benzoyl phenylethoxy phosphine oxide (manufactured by BASF)

IRGACURE-184: 1-Hydroxy-cyclohexyl-phenyl-ketone (manufactured by Ciba Specialty Chemicals Inc.)

POLYOIL 110: Liquid-form polybutadiene (manufactured by Degussa AG)

L-LIR: Liquid-form polyisoprene (manufactured by Kuraray Co., Ltd.)

IRGANOX-1010: Pentaerythrityl tetrakis [3-(3,5-di-t-butyl-4-hydroxyphenyl) propionate] (manufactured by Ciba Specialty Chemicals Inc.)

(Preparation of Pressure-sensitive Adhesive Microcapsule)

An aqueous solution of polyacrylic acid having a solid content of approximately 25% and a viscosity at 25° C. in a range of 8.0 Pa·s to 12.0 Pa·s (manufactured by Wako Pure Chemical Industries Ltd.) (391.7 g) and sodium polyacrylate having a degree of polymerization in a range of 22,000 to 70,000 (manufactured by Wako Pure Chemical Industries Ltd.) (97.9 g) were added to pure water (3,720 g), heated, and dissolved, thereby preparing an aqueous solution of 4.6% by mass of polyacrylic acid/sodium polyacrylate. Each of the radiation-curable gluing agents A to C (14.4 g) was added to the aqueous solution of 4.6% by mass of acrylic acid (120 g) and then was emulsified using a homogenizer at 3,000 rpm for ten minutes. After that, subsequently, an amount described in the following table of a water-dispersible isocyanate (TAKENATE WD-730 manufactured by Mitsui Chemicals Polyurethanes, Inc.) was added thereto while stirring the mixture at 3,000 rpm, was further mixed for ten minutes, and was aged, thereby preparing a microcapsule-containing liquid. Meanwhile, the average particle diameter in the microcapsule prepared at this time was 30 μm. The average particle diameter in the microcapsule was obtained by dropping a microcapsule-containing liquid on a glass slide, measuring the diameters (the observed longest lengths) of arbitrary 20 particles using an optical microscope, and computing the average value thereof.

(Production of Gluing Sheet)
<Preparation of Gluing Sheet>

The prepared microcapsule-containing liquid was applied onto a polyethylene terephthalate (PET) base material using a bar coater at a solid content coating amount of 10 g/m², was heated at 100° C. for two minutes so as to evaporate moisture, and a layer including the pressure-sensitive adhesive microcapsule was formed, thereby obtaining a gluing sheet.

The average film thickness of the layer including the pressure-sensitive adhesive microcapsule was 10 μm. The average film thickness was measured by cutting the coated film using a microtome and observing the film thicknesses using an optical microscope. The difference between the average particle diameter in the pressure-sensitive adhesive microcapsule and the average film thickness was in a range of 15 μm to 40 μm, and protrusions and recesses were formed using the pressure-sensitive adhesive microcapsule on the surface of the layer including the pressure-sensitive adhesive microcapsule.

In addition, the obtained gluing sheet was transparent, and, as a result of measurement using a haze meter NDH2000 type manufactured by Nippon Denshoku Industries, Co., Ltd., the total light transmittance was 89.8%.

Gluing sheets of Examples 2 to 7 were produced in the same manner as in Example 1 except for the fact that, in the preparation of the pressure-sensitive adhesive microcapsule of Example 1, the kinds and added amounts of individual components used were changed as shown in Table 2 below.

In the gluing sheets of Examples 2 to 7, the average film thicknesses of the layers including the formed pressure-sensitive adhesive microcapsule were 10 μm.

In the gluing sheets of Examples 2 to 7, the average film thicknesses of the layers including the pressure-sensitive adhesive microcapsule were smaller than the average particle diameters in the pressure-sensitive adhesive microcapsules, and protrusions and recesses were formed using the pressure-sensitive adhesive microcapsules on the surfaces of the layers including the pressure-sensitive adhesive microcapsule. In addition, the obtained gluing sheets were transparent.

<Radiation Irradiation (Control of Gluing Force)>

The prepared gluing sheets were irradiated with radiation (ultraviolet rays) at irradiation amounts shown in Table 2 below (1,000 mJ/cm² or 3,000 mJ/cm²), thereby preparing gluing sheets of the respective examples.

Comparative Example 1

A gluing sheet was produced in the same manner as in Example 1 except for the fact that the amount of the water-dispersible isocyanate added was set to 3.75 g, and the ultraviolet irradiation amount (UV irradiation amount) of the prepared gluing sheet was changed to 0 mJ/cm².

Comparative Example 2

A gluing sheet was produced in the same manner as in Example 1 except for the fact that the amount of the water-dispersible isocyanate added was set to 3.75 g.

Comparative Example 3

A gluing sheet was produced in the same manner as in Example 1 except for the fact that the amount of the water-dispersible isocyanate added was set to 3.75 g, and the ultraviolet irradiation amount of the prepared gluing sheet was changed to 3,000 mJ/cm².

Comparative Example 4

A gluing sheet was produced in the same manner as in Example 6 except for the fact that the amount of the water-dispersible isocyanate added was set to 3.75 g.

Comparative Example 5

A gluing sheet was produced in the same manner as in Example 7 except for the fact that the amount of the water-dispersible isocyanate added was set to 3.75 g.

Comparative Example 6

A gluing sheet was produced in the same manner as in Example 2 except for the fact that the ultraviolet irradiation amount of the prepared gluing sheet was changed to 0 mJ/cm$^2$.

Comparative Example 7

A gluing sheet was produced in the same manner as in Comparative Example 1 except for the fact that the radiation-curable gluing agent was changed to a solvent-type gluing agent (AT-412 manufactured by Saiden Chemical Industry Co., Ltd., the solid content: 36%), and 40.0 g of the gluing agent was added thereto so that the solid content amount of the gluing agent became identical to that in Comparative Example 1.

Comparative Example 8

A gluing sheet was produced in the same manner as in Comparative Example 6 except for the fact that the radiation-curable gluing agent was changed to a solvent-type gluing agent (BPS5213K manufactured by Toyochem Co., Ltd., the solid content: 35%), and 41.1 g of the gluing agent was added thereto so that the solid content amount of the gluing agent became identical to that in Comparative Example 6.

Comparative Example 9

A gluing sheet was produced in the same manner as in Example 8 except for the fact that the amount of the water-dispersible isocyanate added was set to 0.125 g.

Comparative Example 10

A gluing sheet was produced in the same manner as in Example 9 except for the fact that the amount of the water-dispersible isocyanate added was set to 0.0375 g.

Comparative Example 11

A gluing sheet was produced in the same manner as in Comparative Example 8 except for the fact that tolylene diisocyanate having a solid content concentration of 37.5% (BHS8515 manufactured by Toyochem Co., Ltd., the solid content: 37.5%) was used as the wall material of the microcapsule, and 1.0 g of tolylene diisocyanate was added thereto so that the solid content amount of isocyanate became identical to that in Comparative Example 8.

(Evaluation)

For the gluing sheets obtained in the above-described examples and comparative examples, the following performances regarding the gluing force were evaluated. The results are shown in the following table.

Evaluation 1 (Evaluation of Initial Gluing Force)

The layer including the pressure-sensitive adhesive microcapsule in each of the gluing sheets of the respective examples and comparative examples was brought into contact with a plastic substrate. The gluing sheet was slid while remaining unpeeled, and the resistance at this time was evaluated using the following standards.

1: The gluing sheet was not sticky and could be freely slid on the substrate.

2: The gluing sheet was sticky and could not be freely slid on the substrate.

Evaluation 2 (Evaluation of Gluing Force when Pressure is Applied)

The layer including the pressure-sensitive adhesive microcapsule in each of the gluing sheets of the respective examples and comparative examples was brought into contact with a plastic substrate. After that, the layer was pressurized at a pressure of 1 kg/cm$^2$ or higher, and the gluing force at this time was evaluated using the following standards.

1: During pressurization, the gluing force was absent, and the layer was not sticked.

2: During pressurization, the gluing force was present, and the layer was peeled off within three minutes.

3: During pressurization, the gluing force was present, and the layer was peeled off within 3 minutes to 10 minutes.

4: During pressurization, the gluing force was present, and the layer remains unpeeled 10 minutes or longer.

TABLE 2

| | Gluing agent | | Capsule wall material | | Average particle diameter μm | UV irradiation amount mJ/cm$^2$ | Total light transmittance % | Evaluation 1 (initial gluing force) | Evaluation 2 (gluing force when pressure is applied) |
|---|---|---|---|---|---|---|---|---|---|
| | Type | Kind | Kind | Added amount | | | | | |
| Example 1 | Radiation-curable | Gluing agent A | Water-dispersible NCO | 1.25 g | 40 | 1000 | 89.8 | 1 | 2 |
| Example 2 | Radiation-curable | Gluing agent A | Water-dispersible NCO | 0.375 g | 50 | 1000 | 90.5 | 1 | 4 |
| Example 3 | Radiation-curable | Gluing agent A | Water-dispersible NCO | 0.125 g | 25 | 1000 | 90.5 | 1 | 3 |
| Example 4 | Radiation-curable | Gluing agent A | Water-dispersible NCO | 0.0375 g | 25 | 1000 | 88.5 | 1 | 3 |
| Example 5 | Radiation-curable | Gluing agent A | Water-dispersible NCO | 0.375 g | 50 | 3000 | 90.6 | 1 | 2 |
| Example 6 | Radiation-curable | Gluing agent B | Water-dispersible NCO | 0.375 g | 45 | 1000 | 91.4 | 1 | 4 |

TABLE 2-continued

| | Gluing agent | | Capsule wall material | | Average particle diameter μm | UV irradiation amount mJ/cm$^2$ | Total light transmittance % | Gluing force Evaluation 1 (initial gluing force) | Gluing force Evaluation 2 (gluing force when pressure is applied) |
|---|---|---|---|---|---|---|---|---|---|
| | Type | Kind | Kind | Added amount | | | | | |
| Example 7 | Radiation-curable | Gluing agent C | Water-dispersible NCO | 0.375 g | 45 | 1000 | 89.2 | 1 | 4 |
| Comparative Example 1 | Radiation-curable | Gluing agent A | Water-dispersible NCO | 3.75 g | 35 | 0 | 90.6 | 1 | 1 |
| Comparative Example 2 | Radiation-curable | Gluing agent A | Water-dispersible NCO | 3.75 g | 35 | 1000 | 91.7 | 1 | 1 |
| Comparative Example 3 | Radiation-curable | Gluing agent A | Water-dispersible NCO | 3.75 g | 35 | 3000 | 90.4 | 1 | 1 |
| Comparative Example 4 | Radiation-curable | Gluing agent B | Water-dispersible NCO | 3.75 g | 30 | 1000 | 90.6 | 1 | 1 |
| Comparative Example 5 | Radiation-curable | Gluing agent C | Water-dispersible NCO | 3.75 g | 30 | 1000 | 90.4 | 1 | 1 |
| Comparative Example 6 | Radiation-curable | Gluing agent A | Water-dispersible NCO | 0.375 g | 50 | 0 | 90.1 | 2 | 2 |
| Comparative Example 7 | Solvent-type | AT-412 Saiden Chemical Industry Co., Ltd. | Water-dispersible NCO | 3.75 g | 5 | — | — | 1 | 1 |
| Comparative Example 8 | Solvent-type | BPS5213K Toyochem Co., Ltd. | Water-dispersible NCO | 0.375 g | 20 | — | 89.5 | 1 | 1 |
| Comparative Example 9 | Solvent-type | BPS5213K Toyochem Co., Ltd. | Water-dispersible NCO | 0.125 g | 80 | — | 90.0 | 2 | 4 |
| Comparative Example 10 | Solvent-type | BPS5213K Toyochem Co., Ltd. | Water-dispersible NCO | 0.0375 g | 70 | — | 89.6 | 2 | 4 |
| Comparative Example 11 | Solvent-type | BPS5213K Toyochem Co., Ltd. | Ordinary NCO | 1.00 g (equivalent to 0.375 g of water-dispersible NCO) | 10 | — | 88.9 | 2 | 4 |

From the above table, it is found that the gluing sheets in which the pressure-sensitive adhesive microcapsule of the present invention is used and which is appropriately irradiated with UV have no gluing properties until pressure is applied, but have gluing properties after pressure is applied. As described above, it is found that, in the gluing sheet in which the pressure-sensitive adhesive microcapsule of the present invention is used, it becomes possible to adjust the gluing force and the fluidity. Furthermore, in the pressure-sensitive adhesive microcapsule of the present invention, it is found that the gluing properties can be controlled by adjusting the radiation irradiation amount (UV irradiation amount). On the other hand, it is found that the gluing sheets of the comparative examples are not desirably in terms of at least one of the initial gluing force and the gluing force when pressure is applied.

According to the pressure-sensitive adhesive microcapsule of the present invention, it is possible to provide a gluing sheet which has no gluing properties until pressure is applied, but has a gluing force after pressure is applied. According to the gluing sheet of the present invention, it is possible to attaching the gluing sheet to an adherend without using releasing paper or releasing films. The pressure-sensitive adhesive microcapsule, the pressure-sensitive adhesive microcapsule-containing liquid, the gluing sheet and the method for manufacturing the same, and the method for manufacturing a laminate of the present invention are preferably used in signage fields such as sign boards or bulletin boards, broadcasting fields, stationery fields, and the like and are of highly industrially available.

What is claimed is:

1. A pressure-sensitive adhesive microcapsule having an average particle diameter of smaller than 500 μm, comprising
    a radiation-curable gluing agent is encapsulated by a wall film,
    the wall film is constituted of a water-dispersible isocyanate,
    a content of the water-dispersible isocyanate is in a range of 0.2% by mass to 8.0% by mass of the total mass of the pressure-sensitive adhesive microcapsule; and
    a content of the radiation-curable gluing agent is in a range of 92.0% by mass to 99.8% by mass of the total mass of the pressure-sensitive adhesive microcapsule.

2. The pressure-sensitive adhesive microcapsule according to claim 1,
    wherein the radiation-curable gluing agent includes an acrylate oligomer or a methacrylate oligomer having polyisoprene, polybutadiene, or polyurethane in a skeleton.

3. The pressure-sensitive adhesive microcapsule according to claim 2,
    wherein the radiation-curable gluing agent further includes a softening component and a polymerization initiator.

4. The pressure-sensitive adhesive microcapsule according to claim 2,
wherein the radiation-curable gluing agent further includes an adhesion promoter.

5. A pressure-sensitive adhesive microcapsule-containing liquid comprising:
the pressure-sensitive adhesive microcapsule according to claim 1; and
a binder.

6. The pressure-sensitive adhesive microcapsule-containing liquid according to claim 5,
wherein a content of the water-dispersible isocyanate is in a range of 0.18% by mass to 5.8% by mass of a total solid content of the pressure-sensitive adhesive microcapsule-containing liquid.

7. A gluing sheet comprising:
a layer including the pressure-sensitive adhesive microcapsule according to any one of claims 1 on a support.

8. The gluing sheet according to claim 7,
wherein the layer including the pressure-sensitive adhesive microcapsule is formed on a support by applying a pressure-sensitive adhesive microcapsule-containing liquid onto the support and then carrying out radiation irradiation, and
wherein the pressure-sensitive adhesive microcapsule-containing liquid includes a pressure-sensitive adhesive microcapsule having an average particle diameter of smaller than 500 μm and encapsulating a radiation-curable gluing agent in a wall film thereof, and a binder.

9. The gluing sheet according to claim 8,
wherein a radiation irradiation amount is in a range of 10 J/cm$^2$ to 5,000 mJ/cm$^2$.

10. The gluing sheet according to claim 7,
wherein protrusions and recesses are formed using the pressure-sensitive adhesive microcapsule on a surface of the layer including the pressure-sensitive adhesive microcapsule.

11. The gluing sheet according to claim 7,
wherein an average film thickness of the layer including the pressure-sensitive adhesive microcapsule is smaller than an average particle diameter in the pressure-sensitive adhesive microcapsule.

12. A method for manufacturing the gluing sheet according to claim 7, comprising:
forming a layer including a pressure-sensitive adhesive microcapsule on a support by applying a pressure-sensitive adhesive microcapsule-containing liquid onto the support and then carrying out radiation irradiation,
wherein the pressure-sensitive adhesive microcapsule-containing liquid includes a pressure-sensitive adhesive microcapsule having an average particle diameter of smaller than 500 μm and encapsulating a radiation-curable gluing agent in a wall film thereof, and a binder.

13. A method for manufacturing a laminate, comprising:
gluing the gluing sheet according to claim 7 and an adherend by bringing a surface of the layer including the pressure-sensitive adhesive microcapsule in the gluing sheet and the adherend into contact with each other and compressing them together.

* * * * *